United States Patent [19]
Tomer

[11] Patent Number: 4,717,815
[45] Date of Patent: Jan. 5, 1988

[54] TIME METERING DEVICE PARTICULARLY USEFUL AS A PARKING CARD

[76] Inventor: Natan Tomer, 80 Ben Gurion Blvd., Tel Aviv 64515, Israel

[21] Appl. No.: 767,323

[22] Filed: Aug. 21, 1985

Related U.S. Application Data

[63] Continuation-in-part of Ser. No. 679,572, Dec. 7, 1984, abandoned.

[30] Foreign Application Priority Data

Aug. 29, 1984 [IL] Israel ......................................... 72802

[51] Int. Cl.$^4$ ............................................. G06K 15/00
[52] U.S. Cl. ................................... 235/378; 235/380; 235/384; 235/492; 364/467; 368/90
[58] Field of Search ............... 235/380, 381, 382, 492, 235/377, 384, 378; 368/90; 364/467

[56] References Cited

U.S. PATENT DOCUMENTS

| | | | |
|---|---|---|---|
| 4,310,890 | 1/1982 | Trehn et al. | 368/90 X |
| 4,460,965 | 7/1984 | Trehn et al. | 364/464 |
| 4,498,000 | 2/1985 | Decavele et al. | 235/492 X |
| 4,544,834 | 10/1985 | Newport et al. | 235/380 X |
| 4,575,621 | 3/1986 | Dreifus | 235/492 X |

FOREIGN PATENT DOCUMENTS 2547083 12/1984 France ................................. 368/90

OTHER PUBLICATIONS

Horological Journal, vol. 125, No. 7, Jan. 1983, p. 23, Ashford, Kent, GB; "Multi-Purpose Count-Down Timer".

Primary Examiner—David L. Trafton
Attorney, Agent, or Firm—Benjamin J. Barish

[57] ABSTRACT

A time metering device particularly useful as a parking card comprises a time storage device for storing data representing total pre-purchased time; a time measuring device; time selector keys for manually selecting a predetermined time interval; a predetermined interval storage device; and an "off" key. The time metering device further includes an electrical circuit which decrements both the pre-purchased time storage device and the predetermined interval storage device according to the time measured by the time measuring device until the "off" key is operated, and a display which displays the remaining time in the pre-purchased and predetermined-interval storage devices.

15 Claims, 5 Drawing Figures

FIG 2a (ZONE SELECTION LOGIC)

FIG. 2b (TIME CALCULATING LOGIC)

FIG. 2c (DISPLAY LOGIC)

TIME METERING DEVICE PARTICULARLY USEFUL AS A PARKING CARD

RELATED APPLICATIONS

This application is a continuation-in-part of my copending application Ser. No. 06/679,572, filed Dec. 7, 1984, now abandoned.

BACKGROUND OF THE INVENTION

The present invention relates to time metering devices. The invention is particularly useful as a parking card to replace the conventional parking meter, and therefore the invention is described below with respect to this application.

Conventional parking meters are now widely used in order to control vehicular parking and to encourage maximum turnover of limited parking areas. They also provide a substantial source of income to the municipalities using such meters. However, they involve high initial investment costs, high maintenance costs, and high collection costs, all aggravated by pilferage and vandalism.

Because of these disadvantages of the conventional parking meters, a number of municipalities have adopted the use of parking cards. These are usually cards having tear out sections which indicate the date and the expiration time of a particular parking period, the cards being displayed from the inside of the vehicle by wedging the card into the upper end of a closed window. However, these cards have not been found entirely satisfactory in many locations because of the ease of counterfeiting them or illegally tampering with them for re-use more than one time.

An object of the present invention is to provide a time metering device particularly useful as a parking card having advantages in the above respects.

BRIEF SUMMARY OF THE INVENTION

According to the present invention, there is provided a time metering device useful as a parking card comprising a time storage device for storing data representing a total pre-purchased time; a time measuring device; time-selector key means for manually selecting a predetermined time interval; and a predetermined interval storage device for storing data representing the predetermined time interval selected. The time measuring device further includes a display, decrementing means for decrementing the pre-purchased time storage device and the predetermined interval storage device according to the time measured by the time measuring device beginning at a predetermined time (e.g., a few seconds, or immediately) from the manual operation of the time-selector keys; a device such as an "off" key which, when manually operated, terminates the operation of the decrementing means to decrement the pre-purchased time storage device and the predetermined interval storage device; and means for connecting the display to display the time in the pre-purchased time storage device, and preferably also in the predetermined interval storage device, as decremented by the decrementing means.

The described time metering device is embodied in the form of a card which contains within itself the input keys, the logic circuitry, the display, and a battery power supply, so that it can be sold as a vendable article and disposed after use.

In the described preferred embodiment, there are a plurality of time-selector keys each manually operated to select a different time interval. Each of the time-selector keys represents a different timing zone, particularly a different parking zone when embodied in a parking card, and the predetermined time interval represents the maximum parking time for that zone. The decrementing means decrements the display means and the time storage device at a different rate according to the zone of the time-selector key operated.

Also in the described preferred embodiment, the card further includes penalty means effective, when the maximum time interval for the respective zone has expired and the "off" key has not been operated, to provide a signal in the display means of the fact that the preselected time interval has expired, and thereafter to increase the rate of decrementing the time storage device until the "off" key is operated.

It will thus be seen that a time metering device, and particularly a parking card, constructed in accordance with the above features, provides a number of advantages both to the users and to the municipalities. Thus, the user pays only for the actual time he is parked, assuming he does not go over the maximum period for the respective zone. The card can be constructed small enough for carrying in a pocket size wallet or for storing in the car, and is very convenient to use. With respect to the municipality, the initial investment, maintenance and collection costs are very substantially reduced; the revenue to the municipality may be substantially increased not only by the purchased parking time but also by the penalties when overparking; a higher turnover of limited parking areas can be effected; and better control of the limited parking areas can also be effected according to the particular area involved.

The parking card also provides a high degree of flexibility in that it permits changes to be conveniently made in the parking rates as well as in the parking zones during changing conditions.

Further features and advantages of the invention will be apparent from the description below.

BRIEF DESCRIPTION OF THE DRAWINGS

The invention is herein described, by way of example, with reference to the accompanying drawings, wherein.

BRIEF DESCRIPTION OF THE DESCRIBED EMBODIMENT

Figure 1:
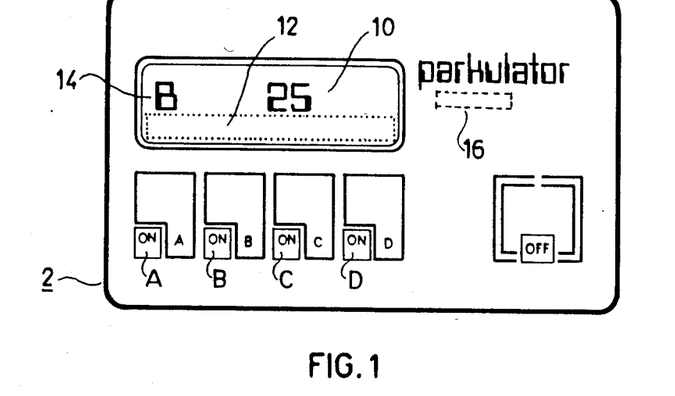
FIG. 1 illustrates one form of time metering device constructed as a parking card in accordance with the present invention.

The parking card illustrated in FIG. 1 of the drawings is a unitary card to be purchased in advance by the user to provide a pre-purchased time period which may be used as and when desired by the user for parking his vehicle. The pre-purchased time period may be, for example, 100 hrs, which time period is stored in the card as will be described more particularly below. When using the card, the purchaser first determines the parking zone in which the card is to be used, and then may use that card for the maximum period of time permitted in that parking zone, assuming that the pre-purchased time is sufficient for that parking interval. During each such use of the card, the actual time used is subtracted from the total pre-purchased time until exhausted, which fact will be indicated at any further attempt to use the card.

The card includes a number of zone keys selectively depressed according to the parking zone in which the card is to be used. Each zone has its own maximum parking period, its own charging rate for each elapsed increment of time (e.g. minute), and its own penalty charge for overstaying the maximum parking period. The parking charge begins substantially with the depression of a selected zone key (actually a short time thereafter to enable certain functions to be performed as will be described more particularly below), and ends when the "off" key is depressed. A further key is included providing unlimited parking time, a minimum charging rate and no penalty charge irrespective of the length of the parking interval until the pre-purchased time is exhausted.

The parking card illustrated in FIG. 1 is provided with both a digital display and a bar display. The digital display displays the maximum time period for the selected zone, which display is decremented with time until the "off" key is depressed. This digital display is also used, in the described embodiment, for several other functions, including displaying the total remaining pre-purchased time, and displaying code number which is to be correlated with the serial number of the card to provide an inspector with means for determining whether the card is a valid one or a counterfeit. The bar display displays the selected predetermined time interval in the form of a bar of full scale length, which bar is shortened at a rate corresponding to the selected zone so as to be of zero length at the expiration of the maximum time interval for that zone. The card display also includes a display of the selected zone.

Figure 2A:
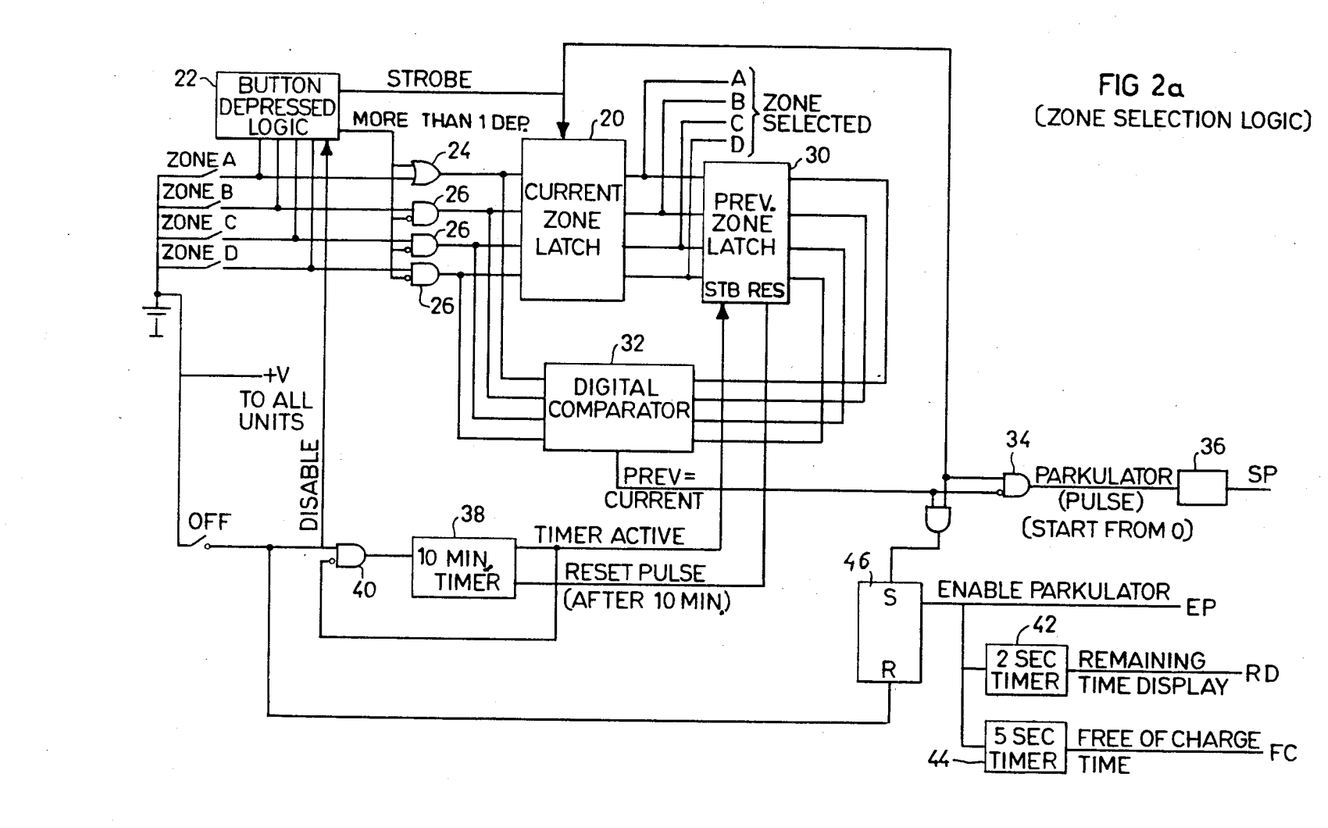
FIGS. 2a, 2b and 2c are block diagrams illustrating one implementation of the electronic circuit in the parking card of FIG. 1, FIG. 2a illustrating mainly the zone selection logic, FIG. 2b illustrating mainly the time calculating logic, and FIG. 2c illustrating mainly the display logic.
Figure 2B:
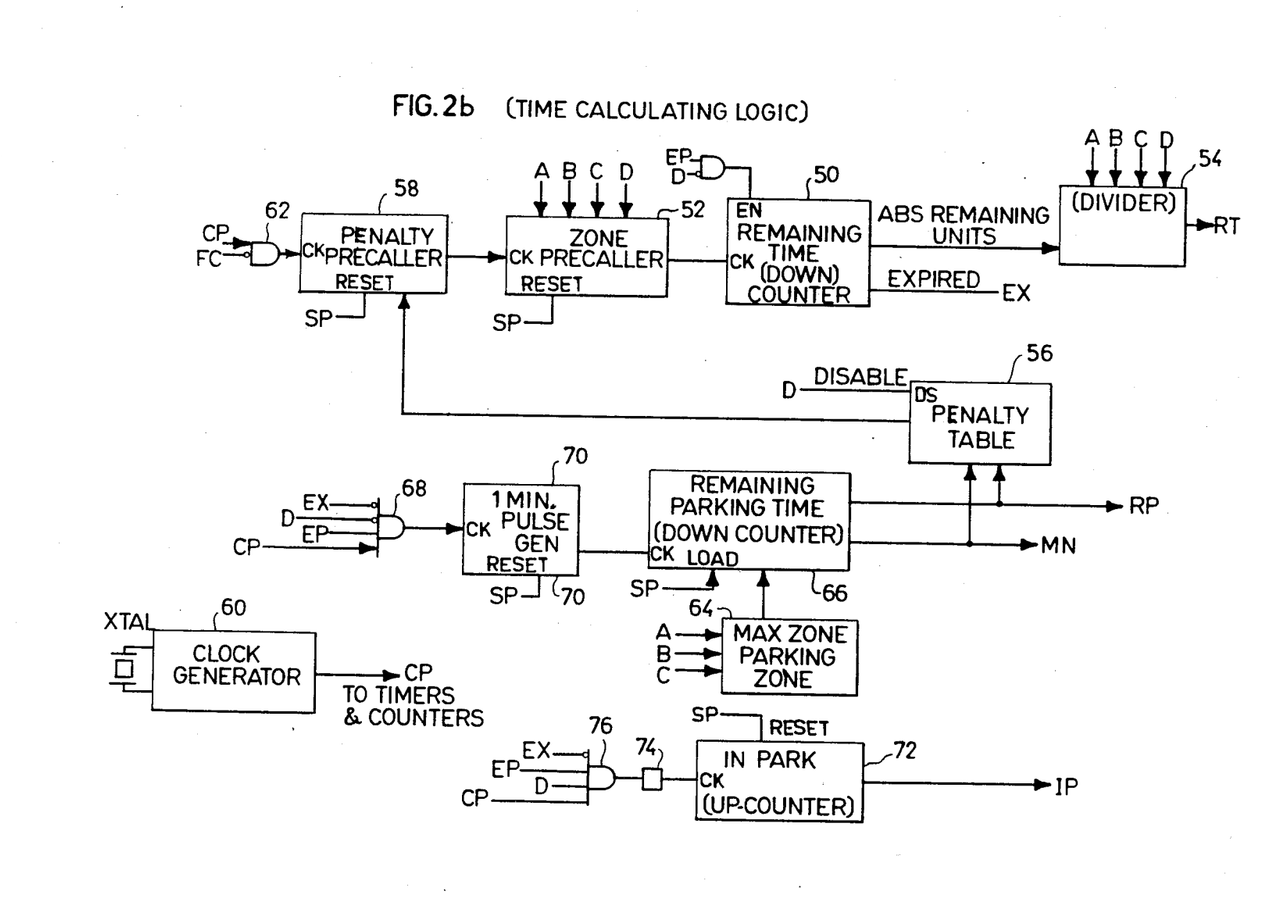
Figure 2C:
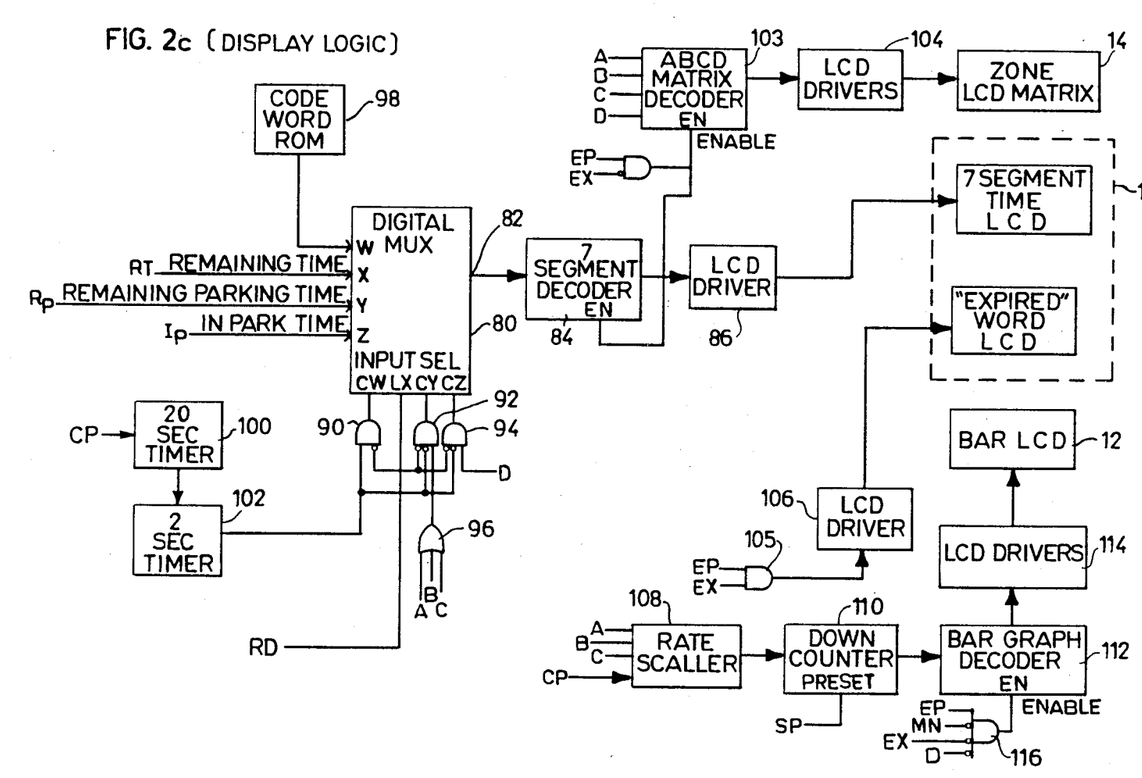

The foregoing, as well as additional features and functions, are implemented in the parking card having the structure illustrated in FIG. 1 and the electrical circuit as illustrated in FIGS. 2a, 2b and 2c.

DETAILED DESCRIPTION OF DESCRIBED EMBODIMENT

Card Structure (FIG. 1)

With reference to FIG. 1, the card therein illustrated, and generally designated 2, includes four zone-selector keys, namely keys A, B, C and D. Key-A relates to zone-A providing the smallest maximum parking time, e.g. 30 minutes; key-B relates to zone-B providing a larger maximum parking time, e.g. one hour; key-C relates to zone C providing a still larger maximum parking time, e.g. two hours; and key-D relates to zone-D providing an unlimited parking time.. The keys, and/or the zones to which they relate, may be color-coded to facilitate selection by the user, for example red for zone-A, yellow for zone-B, blue for zone-C and green for zone -D.

The parking card illustrated in FIG. 1 includes a further key labeled "off". This key is depressed when the user returns to the parked vehicle and prepares to move it from the parking space. The depression of the "off" key terminates the time being charged to the card which started with the depression of any one of keys A, B, C or D.

Parking card 2 illustrated in FIG. 1 further includes three display areas, namely digital display area 10, bar display area 12, and zone display area 14. Digital display area 10 is used for displaying various types of information, but primarily for displaying the maximum time interval for the zone selected by depressing one of the keys A-D, which digital display is decremented with the elapse of time that the vehicle is parked until key-"off" key is depressed. Bar display 12 indicates, in graphical form, the relative time interval remaining from the maximum period selected. Area display 14 displays the identification of the zone (A-D) corresponding to the zone key A-D selected.

Parking card 2 illustrated in FIG. 1 further includes an area 16 on which is printed the serial number of the respective card. As will be described more particularly below, a code number is periodically displayed in the digital display area 10. This number may be an arbitrary single digit number, different for different cards, and is checked by the inspector with the serial number, according to a master list supplied FIGS. 2a, 2b and 2c illustrate one electrical circuit which may be used for controlling the above-described displays on the parking card 2 in response to the elapse of time after one of the keys A, B, C, D has been depressed, which starts the time counting interval, until the "off" key is depressed which terminates the time counting interval.

Zone-Select Circuit (FIG. 2a)

Reference is first made to FIG. 2a which illustrates mainly the zone selection logic controlled by depressing one of the zone keys A-D. This circuit includes a connnection from each of the zone keys A-D to a current zone latch 20 which latches the selected zone signal A-D even after the respective key has been released. Between keys A-D and the current zone latch 20 are provided a logic circuit 22 having a connection to an OR-gate 24 and three AND-gates 26. Logic circuit 22 may be of known design and determines which zone A-D will be selected in case two or more of the zone keys A-D are simultaneously depressed. Thus, if two or more such keys are depressed, logic circuit 22 applies an output to OR-gate 24, the input of that gate being from the A-zone key, and also outputs to the three AND-gates 26 which outputs are inverted at the input of the respected AND-gate. These three AND-gates receive a second input from their respective zone keys B-D, such that if two or more of the zone keys A-D are simultaneously depressed, the result will be that only zone A will be selected by the current zone latch 20.

The circuit illustrated in FIG. 2a further includes a previous zone latch 30 which is connected to the output of the current zone latch 20. A digital comparator 32 compares the input of the current zone latch 20 with the output of the previous zone latch 30, to determine whether the same zone A-D was selected during the previous use of the parking card. If the previous zone was not the same as the current zone, as determined by the inverted input into AND-gate 34, the latter gate produces an output signal which is converted by a one-shot multivibrator 36 to a narrow pulse SP. The latter pulse is effective to enable starting the parking card. The actual starting is effected by a strobe pulse STROBE outputted from logic circuit 22 and also used for controlling latch 20.

The provision of the previous zone latch 30 together with the digital comparator 32 is to prevent the user from adding time to the maximum parking time of the respective zone by merely depressing the "off" key and repressing the respective zone key A–D. This period, in which the parking card may not be used for the same parking zone, lasts only for ten minutes, as determined by a ten minute timer 38. Whenever the "off" key is depressed, timer 38 is started, and may not be turned off by another depression of the "off" key during this 10 min. time interval, this being assured by AND-gate 40. During this 10 min. time interval, the previous zone latch 30 is enabled by a strobe pulse STB from timer 38; but as soon as this 10 min. time interval has elapsed, timer 38 resets latch 30. The arrangement is such that only after the 10 min. interval has elapsed from the last depression of a zone key, may that same zone key be depressed in order to restart the use of the parking card.

The circuit illustrated in FIG. 2a includes two additional timers, namely a 2-second timer 42 and a 5-second timer 44 both controlled by a set-reset flip-flop 46. The latter is reset whenever the "off" key is depressed, and set by the strobe pulse STROBE. The flip-flop when set: produces an enable-parking card signal EP; starts the timer 42 which produces, after the elapse of two seconds, a remaining time display signal RD; and also starts timer 44 which produces, after the elapse of five seconds, a free of charge signal FC. As will be described below, particularly with reference to FIG. 2c signal RD causes digital display area 10 to display the remaining time of the total pre-purchased time for a period of two seconds after each depression of a zone key A–D; and signal FC disables the system from charging parking time against the total pre-purchased time for a period of five seconds after each depression of a zone key A–D. The latter enables the user first to see the remaining time at his disposal before charging his card with the parking time, so that if there is insufficient time remaining, the user may depress the "off" key and thereby disable the operation started by the previous depression of a zone key A–D.

As indicated earlier, the zone key A–D depressed determines the maximum time period that the parking card may be used at that particular time. In the described example as illustrated in FIG. 1, zone key A selects a maximum of 30 min., key B a maximum of 1 hr., key C a maximum of 2 hrs., and key D has no maximum but may be used for an unlimited time period. The key A–D depressed also determines the rate at which the elapsed time is charged against the total pre-purchased time as stored in the time storage device. The zone key selected also determines the penalty charge to be applied whenever the user, in that particular parking operation, overstays the maximum time period for the respective zone.

Time Calculating Circuits (FIG. 2b)

FIG. 2 illustrates the time calculating logic for implementing the foregoing operations. Thus, as shown in FIG. 2b, the time storage device for storing the data representing the total pre-purchased time is indicated by block 50. This is a down-counter initially preset to the total pre-purchased time and then decremented, by down-counting, for substracting therefrom the used time, as and when used, until the pre-purchased time is exhausted.

Block 52 in FIG. 2b represents a zone pre-scaler circuit having the four zone-select input signals A–D. Circuit 52 introduces a "weight" or "scale" factor fixing the rate at which the total-time storage device 50 is decremented according to the zone selected. This rate should be inversely related to the maximum time period for the respective zone. For example, the maximum time period for zone C is four times that of zone A, and therefore the rate at which storage device 50 is decremented when zone A is selected may be four times the rate when zone C is selected. In such a case it would be desirable to apply even a lower rate of decrementing storage device 50 when zone D is selected, for example one-half the rate of zone C. It will be appreciated, however, storage device 50 may be used according to specific situations, one of the advantages of the present invention being that this weight factor can be easily changed, by properly changing circuit 52, according to any desired situation.

So long as there is still time remaining in storage device 50 from the total pre-purchased time, the storage device outputs a signal ABS representing the remaining time in absolute units. This remaining time is also scaled (upwardly or downwardly, as the case may be) according to the zone select-signal A–D to produce a remaining purchased time signal RT which signal is transmitted to the display logic illustrated in FIG. 2c as will be described more particularly below. On the other hand, if the total of the purchased time stored in storage device 50 has been used up, then the latter device outputs an expired signal EX, which signal is also fed to the display logic of FIG. 2c.

In calculating the remaining-purchase-time signal RT, the actual parking time, properly scaled according to the selected zone as described above, is deducted from the total pre-purchased time as stored in storage device 50. Also subtracted from that time is any penalty charge because the user overstayed the maximum parking time for the respective zone. This penalty time is also scaled according to the zone, being higher for zone A than for zone C; since zone D does not have a maximum parking time, there is no penalty charge for that zone. The penalty rate is stored in a penalty look-up table 56 which is connected to a penalty pre-scaler circuit 58 on the input side of the time storage device 50 storing the total pre-purchased time. Thus, the penalty rate, appropriately scaled according to the zone as preset by penalty table 56, is also subtracted from the total pre-purchased time stored in storage device 50.

The circuit illustrated in FIG. 2b further includes a clock generator 60 outputting clock pulses CP to the various timers and counters.

These clock pulses are not immediately applied to decrement total-time storage counter 50 upon depressing one of the zone keys A–D, but are applied only after the elapse of the free time of 5 secs; this is indicated by AND-gate 62 having, in addition to the input of the clock pulses CP, also an inverted input of the free-of-charge signal FC. As described above with respect to FIG. 2a, the free-of-charge signal FC is present for the first five seconds after depressing a zone key A–D in order to provide time to display the total purchases time remaining in storage device 50 (displayed for the first two seconds) before the parking time starts to be deducted from the storage device.

The circuit illustrated in FIG. 2b calculates not only the remaining purchased time signal RT, but also the remaining parking time signal RP, namely the time remaining from the maximum parking time permitted in the zone selected by depression of the zone key A–C. Signal RP is applicable only to zones A–C, since zone D does not have a maximum parking time in our example.

Thus, the remaining parking time signal RP is calculated by inputting the zone-select signal A–C signal into a unit 64, for example a ROM (read only memory), which has stored therein the maximum parking times for the zones A, B, C. Unit 64 presets a counter 66 to the value of the maximum parking time corresponding to the selected zone. Counter 66 is then down-counted or decremented by the clock pulses CP via AND-gate 68 which controls a timing device 70 outputting e.g. one pulse per minute, to down-count or decrement counter 66. The output of counter 66 appears as the remaining parking time signal RP, which is fed to the display logic illustrated in FIG. 2c as will be described below. In the event counter 66 is down-counted past "0", indicating that the user has overstayed the maximum parking time, a minus remaining parking time signal MN is outputted to the display logic illustrated in FIG. 2c, and also to the penalty table 56 described above.

As shown by the inputs to AND-gate 68, the timing device 70, which decrements counter 66 to produce either the remaining parking time signal RP or the minus parking time signal MN, is actuated by each clock pulse CP only after receiving the enable-parking card signal EP, provided there is no D-signal (i.e., the D-zone has not been selected), and further provided that there is no EX-signal (i.e. the total pre-purchased time as stored in storage device 50 has not yet been used up).

If the D-zone was selected by depression of the D-key, then an in-park counter 72 is incremented to produce an in-park-counter signal IP which is fed to the display logic of FIG. 2c. Counter 72 is up-counted or incremented by a timing device 74, corresponding to timing device 70 for counter 66, for each clock pulse CP when the D-zone has been selected; this is indicated by AND-gate 76 having inputs for the CP, D and EP signals, and an inverted input from the EX signal indicating that the total pre-purchased time as stored in storage device 50 has not yet been used up.

Display Circuits (FIG. 2c)

FIG. 2c illustrates the portion of the circuit applicable to the various displays in areas 12, 14 and 16 of the card illustrated in FIG. 1. Area 10 displays various digital data as will be described more particularly below; area 14 is a bar display, graphically displaying the remaining time of the ordered time interval; and area 14 displays the zone selected by the depression of a zone selector key A-D. All the foregoing displays are preferably liquid crystal displays (LCD) in order to conserve energy.

With respect to the digital display 10, this display is controlled by a multiplexing switching device 80 which has four data inputs, designated W, X, Y, Z, respectively, controlled by four input selector circuits CW, CX, CY, CZ, which select the input to be applied to the switching output 82. The selected output from the switching device 82 is applied via a 7-segment decoder 84 and an LCD driver 86 to display area 10 on the card.

The four inputs to the multiplexing switching device 80 are selectively fed to the display area 10 under the control of the selector circuits, including AND-gates 90, 92, 94, and OR-gate 96, according to the following sequence:

First to be displayed is the information at the X-input port under the control of the CX-control port, since the latter port receives the control signal directly. The control signal is the RD signal (remaining time display) from the 2-second timer 42 in FIG. 2a, and the input information is RT representing the total time remaining of the purchased time as derived from the circuit in FIG. 2b. Accordingly, the remainder of the total purchased time will first be displayed for a period of two seconds.

Next to be displayed is the information at the W-input port under the control of the CW-control port. This information is derived from a code word generator 98 which randomly generates a code word, e.g. a single digit number. This code word is displayed for a period of two seconds every 20 seconds, as determined by 20-second timer 100 and 2-second timer 102 connected to the CW control port via AND-gate 90. Accordingly, this code word will be displayed for a period of two seconds immediately after the display of the remainder of the purchased time (RT) for a period of two seconds, and for a similar period every 20 seconds thereafter. This code word may thus be viewed by the inspector and checked with a master list, relating code words to card serial numbers, to assure that the parking card being inspected is a valid one and is not a counterfeit.

Last to be displayed in display area 10 is either the remaining parking time information RP derived from the down-counter 66 in FIG. 2b, or the in-parking time information IP derived from the up-counter 72 in FIG. 2b, depending upon which of the zone keys A-D was depressed. Thus, if a zone key A-C was depressed, which zones have a predetermined maximum parking period as described above, then the RP information at the Y-input port of switching device 80 is outputted under the control of the CY control port; but if the D-zone key is depressed, this zone permitting an unlimited parking time, then the IP information at the Z-input port is outputted to the digital display under the control of AND-gate 94 connected to the CZ-control port.

The digital display area 10 is also used for displaying the word "EXPIRED" in case all the pre-purchased time has already been consumed. As described above, this condition results in the time storage device 50 illustrated in FIG. 2b producing an EX-signal. This signal is applied to AND-gate 105 in FIG. 2c, together with the enable parking card signal EP, to LCD driver 106 which causes the word "EXPIRED" to be displayed in digital area 10.

With respect to the bar display 12, this display is controlled by a rate scaler 108, a down-counter 110, a bar graph decoder 112, and an LCD driver 114. The bar display is enabled by the enable parking card signal EP, but is disabled by the D-signal (when the D-zone key is depressed), by the EX signal (when the total purchased time has been consumed), or by the MN signal (when the remaining parking time goes minus), all as determined by the inputs to AND-gate 116 controlling the bar graph decoder 112.

When none of the foregoing conditions has occurred, as soon as one of the keys A, B or C has been depressed, also producing the SP (start parking meter) signal (FIG. 2a), display area 12 of the card will display a bar of full scale length. This bar is then shortened with each clock pulse CP at a rate determined by rate scaler 108 for the respective zones A, B, C, so as to be of zero length at the expiration of the preselected parking interval corresponding to these three zones.

Summary

Following is a summary of the manner of using the parking card 2 illustrated in FIG. 1 and the operation of the electrical circuit as illustrated in FIGS. 2a-2c.

The user purchases the parking card preloaded with a total pre-purchased parking time, for example 100 hrs. This time is stored in the time storage device 50 of FIG.

2b. When the total pre-purchased parking time has been consumed, additional parking time may be loaded into the card by purchasing same, as in a postage meter. It is contemplated, however, that the cards can be produced in volume and at low cost, by using large scale integration (LSI) techniques, so that it would be suitable for one-time use. However, in such case, it would be desirable to include a deposit fee which is refundable as a credit, together with any unused amount remaining in the card, when purchasing a new card, in order to minimize littering by disposing of these cards.

When the user desires to use the card for parking his vehicle in a restricted parking area, the user first determines the zone of the respective area. The restricted parking zones specify maximum parking times which would be prominently displayed. In our example, zone A has a maximum parking time of 30 min., zone B of one hr., zone C of two hrs., and zone D has no maximum parking time but permits an unlimited parking time. The number of zones, and the maximum parking times permitted, may of course vary according to the specific conditions.

The user then depresses the appropriate zone key A–D. As soon as this is done, a check is made, by digital comparator 32 (FIG. 2a), to determine whether the same card was used during the preceding ten minutes for the same zone; if so, comparator 32, comparing the previous zone latch 30 with the current zone latch 20, does not produce the starting pulse SP to start the parking card, until at least ten minutes have elapsed from the preceding use of the parking card for the same zone, as determined by timer 38. If the parking card, however, is used in a different zone from the preceding one, or at any time more than 10 minutes after its use in the same zone, the start signal SP is produced by digital comparator 32 to start the parking metering process.

If the user wishes to park his vehicle in zone A, he depresses the A key on the parking card. This causes a number of things to occur:

First, under the control of the multiplexing switching device 80 in FIG. 2c, the remaining time of the total purchase time (RT) is displayed in the digital display area 10 for a period of two seconds, this information being switched from the input port W of switching device 80 to the output port 82 via the RD signal applied to the CX-control port.

Next, the code word generated in generator 98, as applied to the W-input port of switching device 80, is applied, under the control of its CW control port, for a period of two seconds, and is repeated for two seconds every twenty seconds thereafter. As described above, this enables the inspector to check the code word with a master list correlated with serial numbers to assure that the parking card is a valid one and is not a counterfeit.

Next, since the A-zone key was depressed (and not the D-zone key), the data on line RP is next applied to the digital display area 10 of the card. As described above with respect to FIG. 2b, data on line RP consists of the maximum parking time specified for the respective zone; in this case, display area 10 displays 30 min. for zone A. This maximum parking time for the respective zone is inputted into down-counter 66 (FIG. 2b), and the counter is then subsequently decremented by the time measuring device 70. The data on line RP from the down-counter 66 thus represents the remaining parking time for the respective zone. This is continuously displayed so that the inspector, as well as the user, is continuously advised that the vehicle is legally parked.

The actual parking time, which decrements counter 66, also decrements counter 50 in which is stored the total pre-purchased time. However, the rate of decrementing counter 50 is at a scaled rate, determined by the respective zone. Thus, if zone A permits a maximum parking time which is one forth of that of zone C, for example, the scaling rate at which zone A decrements counter 50 may be four times that at which zone C decrements the counter.

The user then places the parking card in a location viewable on the outside of the vehicle by an inspector.

When the user returns to the vehicle, he depresses the "off" key. This resets flip-flop 46 and terminates the enable-parking card signal EP, thereby terminating the operation of the parking card.

Should the user overstay the maximum parking period for the respective zone, counter 66 (FIG. 2b) will go below "0" and will produce a MN (minus) value signal. This minus value is applied via penalty table 56 to counter 50, and thereby causes the counter to be decremented at an even higher rate, depending upon the penalty to be applied for overparking in the respective zone.

If, however, the D-zone key was depressed, permitting unlimited parking, then digital display 10 displays only the in-parking time from counter 72 (FIG. 2b), advising both the user and the inspector of the period of time in which the vehicle has been parked at that space. This time is also subtracted from the total purchased time stored in counter 50, but at the lowest scale rate, for example ¼ the rate of zone C, in order to encourage the use of parking in zone D.

The zone selected is displayed in area 14 of the card under the control of the matrix decoder 103 and the LCD driver 104 illustrated in FIG. 2c.

Whenever the total purchase time as stored in counter 50 has been consumed, the latter produces the EX (expired) signal which is applied, via AND-gate 105 and LCD driver 106, to display area 10 of the card to display the word "EXPIRED".

Whenever zone key A, B or C is depressed, a bar of full scale length appears in bar display area 12 of the card. This bar length is decremented by down-counter 110 (FIG. 2c) at a rate determined by rate scaler 108 for the several zones A, B, C, such that at the expiration of the maximum parking time permitted for the respective zone the bar length will be "0". Thus, by a quick glance, the inspector, and also the user, can determine how much time is left before the expiration of the maximum parking time permitted for the respective zone.

Figure 3:
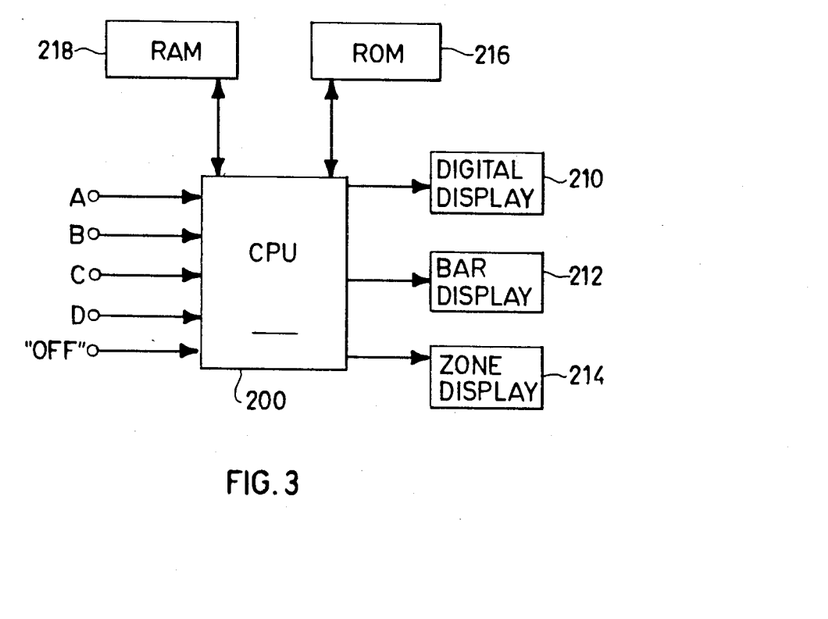
FIG. 3 illustrates a microprocessor implementation of the electrical circuit in the parking card of FIG. 1.

Microprocessor Implementation (FIG. 3)

While FIGS. 2a–2c illustrate a conventional circuit imnplementation of the electrical circuit included in the parking card of FIG. 1, it will be appreciated that the circuit could also be implemented by a microprocessor. FIG. 3 illustrates such an implementation, and particularly the various inputs and outputs of the microprocessor.

Thus, as shown in FIG. 3, the microprocessor would include a CPU (central processor unit) having four inputs representing the zone selector keys A, B, C, D, and a further input corresponding to the "off" key which terminates the operation of the parking card. The outputs of the CPU 200 include the digital display 210, bar display 212, and zone display 214, all corresponding to the displays in areas 10, 12 and 14 in the FIGS. 2a–2c implementation. The microprocessor further includes a ROM (read only memory) 216, which registers the total pre-purchased time and transfers same to the RAM 218, described below, in such manner that the purchased time is decreased during the use of the parking card. The ROM 216, or another ROM, would of course also include the program for operating the CPU.

The RAM (random access memory) 218 is provided for handling the data as it is being processed by the CPU 200.

Many microprocessors are now commercially available which can be used for this purpose, and the programming techniques for programming them to perform the various operations described above are also well known and involve merely routine design. Accordingly, further details of the construction and operation of a microprocesor implementation of the invention are not necessary and are therefore not set forth herein.

While the invention has been described above as embodied in a parking card for vehicles, it will be appreciated that the invention could also advantageously be used in other time metering devices. Examples of such other uses could include renting time on a tennis court, golf course, subways, or the like. In addition, instead of having the time-selector keys manually operated, they could be machine-operated, such as by inserting the card into a machine. Many other variations, modifications and applications of the invention will be apparent.

What is claimed is:

1. A time metering device particularly useful as a parking card, comprising:
   a time storage device for storing data representing a total pre-purchased time;
   a time measuring device;
   time-selector key means for manually selecting a predetermined time interval;
   a predetermined interval storage device for storing data representing the predetermined time interval selected;
   display means;
   and an electrical circuit including:
   decrementing means for decrementing said pre-purchased time storage device and said predetermined interval storage device according to the time measured by said time measuring device beginning at a predetermined time from the manual operation of said time-selector key means;
   device which terminates the operation of said decrementing means to decrement said pre-purchased time storage device and said predetermined interval storage device;
   and means for connecting said display means to display the time in said pre-purchased time storage device as decremented by said decrementing means.

2. The time metering device according to claim 1, wherein said time-selector key means may be manually operated to select any one of a plurality of different time intervals.

3. The time metering device according to claim 2, wherein said time-selector key means selects different parking zones, and the predetermined time intervals represent the maximum parking time for the selected zone.

4. The time metering device according to claim 3, wherein said decrementing means decrements said pre-purchased time storage device and said parking interval storage device at a different rate according to the parking zone selected.

5. The time metering device according to claim 1, further including penalty means effective, when the selected predetermined time interval has expired and said devices which terminates the operation of the decrementing means has not been operated, to provide a signal in said display means of the fact that the selected predetermined time interval has expired, and thereafter to increase the rate of decrementing the pre-purchased time storage device until said latter device is operated.

6. The time metering device according to claim 1, wherein said electrical circuit further includes means for displaying the remaining time stored in said pre-purchased time storage device substantially immediately upon operating said time-selector key means, before the selected predetermined time interval is displayed.

7. The time metering device according to claim 4, wherein said display means displays the remaining time stored in both storage devices in a form which has been scaled according to the rate of the parking zone selected.

8. The time metering device according to claim 1, wherein said electrical circuit includes delay means for delaying the decrementing means for a short time period sufficient for the user to view the display of the remaining pre-purchased time stored in the time storage device.

9. The time metering device according to claim 1, wherein said time-selector key means may be operated to represent a zone of unlimited time, which when so operated, decrements the pre-purchased time storage device according to the time measured by the time measuring device until said device which terminates said decrementing means is operated.

10. The time metering device according to claim 1, wherein said display means comprises:
    a digital display displaying the selected predetermined time interval in digital form as decremented by said decrementing means;
    and a bar display displaying the selected predetermined time interval in the form of a bar of full scale length, which bar is shortened by said decrementing means at a rate so as to be of zero length at the expiration of the selected predetermined time interval.

11. The time metering device according to claim 1, wherein said electrical circuit includes comparator means comparing the selected predetermined time interval with the pre-purchased time stored in said pre-purchased time storage device; and display-enabling means enabling the display to display said predetermined time interval if said interval is no larger than the current pre-purchased time stored in said pre-purchased time storage device.

12. The time metering device according to claim 1, wherein said device further carries a viewable serial number, and said display means further displays, at periodic intervals, a code marking viewable with the serial number of the respective time metering device to indicate whether the latter device is valid.

13. The time metering device according to claim 3, wherein said device for terminating said decrementing means comprises an "off" key, and said electrical circuit further includes:
    means for storing an identification of the parking zone selected by the operation of the time selector key means; and means for preventing the selection of the same parking zone for a predetermined time period after the time interval for such previous zone was terminated by the operation of the "off" key.

14. The time metering device according to claim 3, wherein said time selector key means includes a plurality of zone selector keys which are color coded.

15. The time metering device according to claims 1, wherein said card further includes a battery power supply.

* * * * *